Aug. 12, 1952        G. C. F. ASKER        2,606,627
AUTOMATIC GAS DRIER
Filed March 22, 1948        3 Sheets-Sheet 1
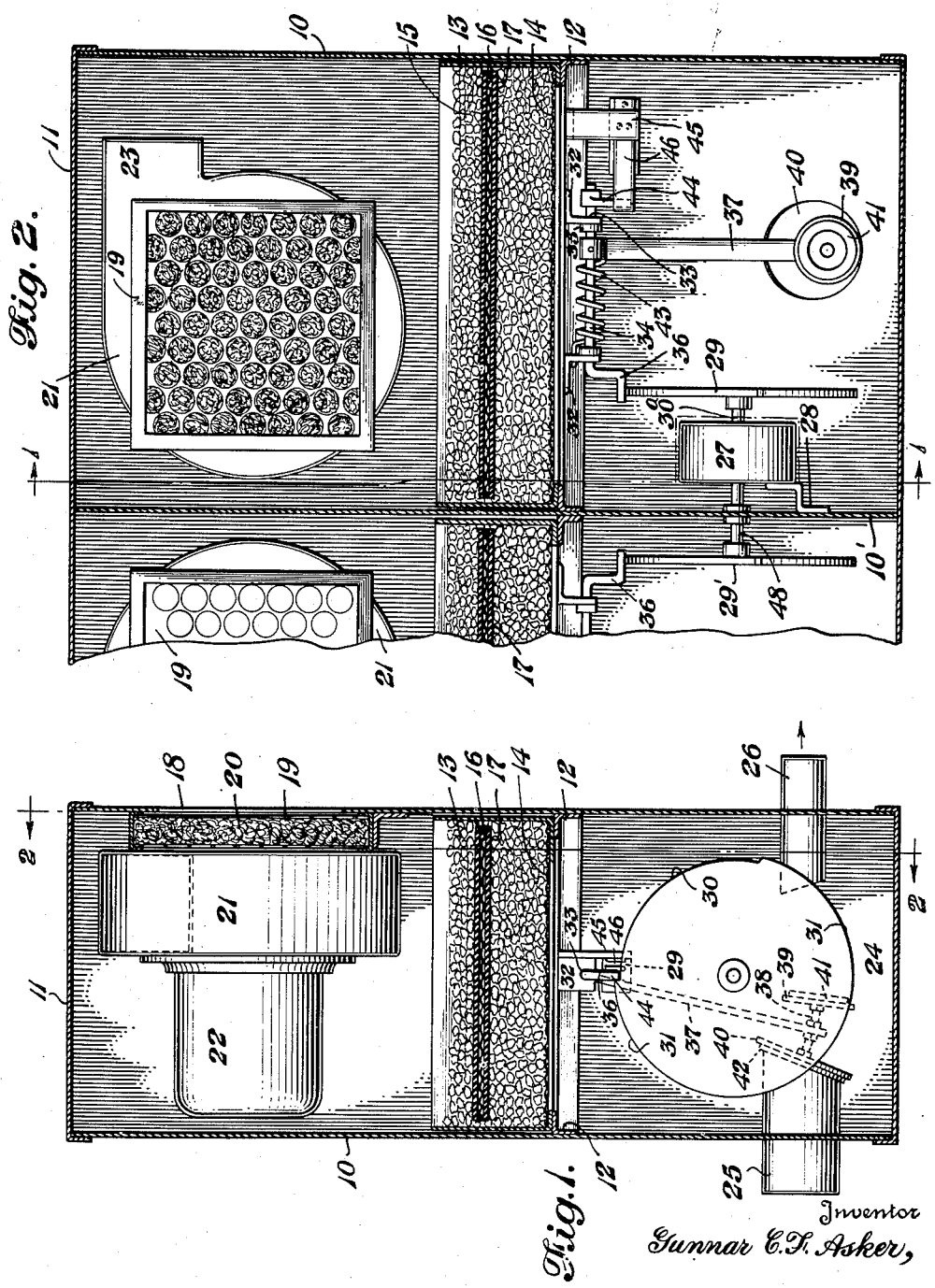
Inventor
Gunnar C.F. Asker,
By Sal B Wicel
Attorney

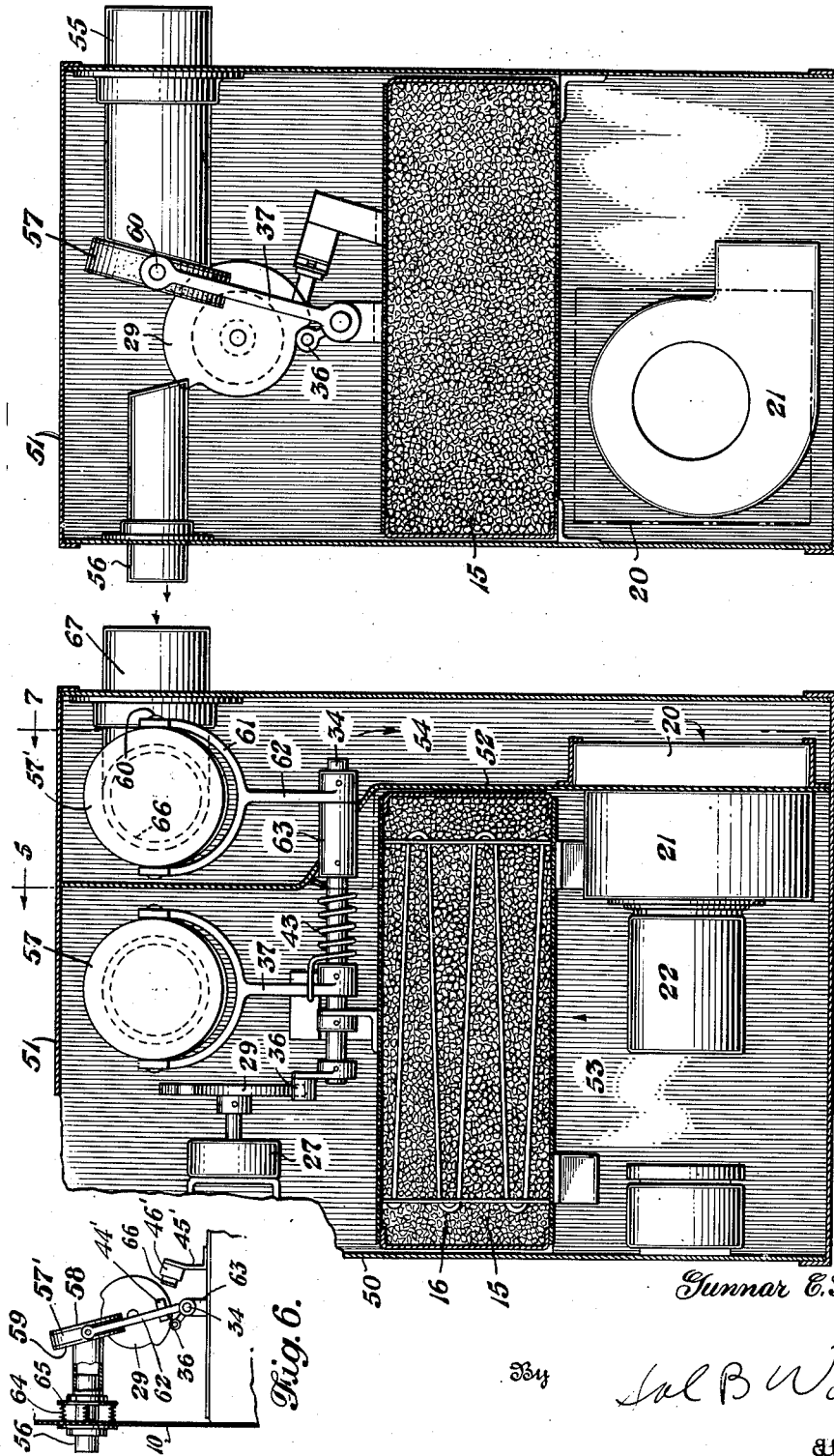

Aug. 12, 1952        G. C. F. ASKER        2,606,627
AUTOMATIC GAS DRIER
Filed March 22, 1948        3 Sheets-Sheet 3
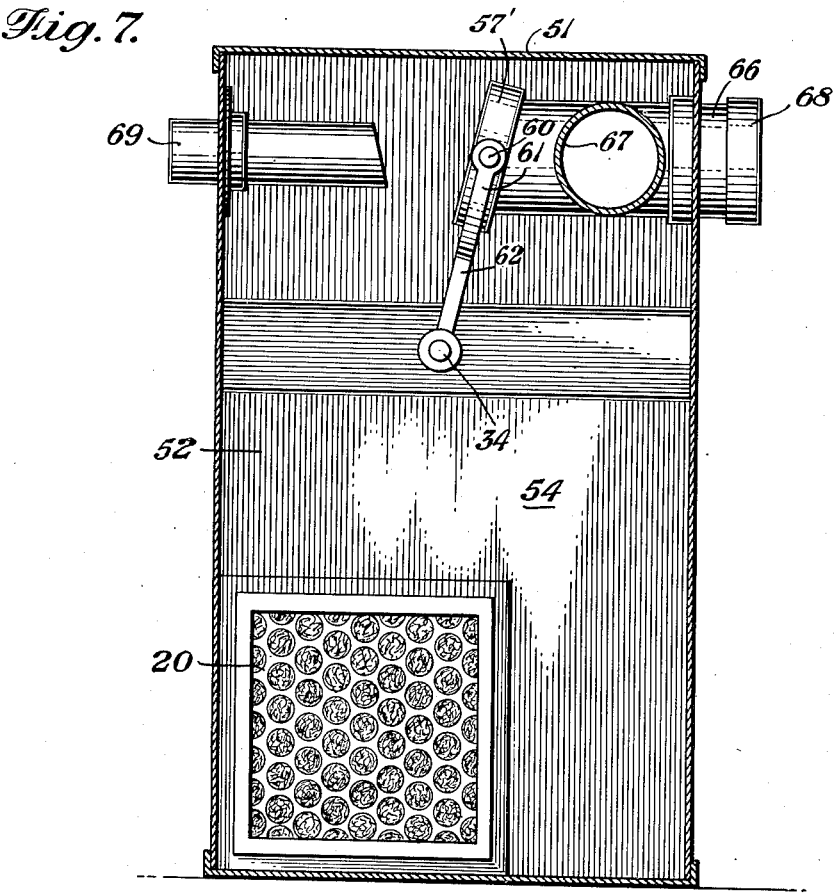
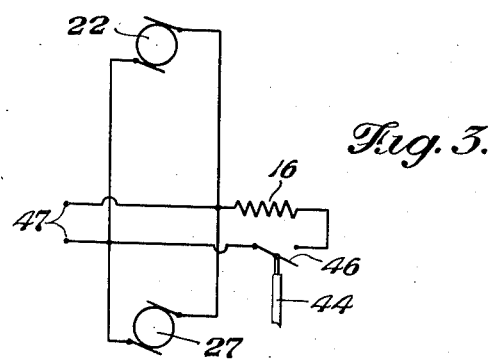
INVENTOR
Gunnar C. F. Asker,
BY
*Sol B Wiegg*
ATTORNEY Patented Aug. 12, 1952

2,606,627

UNITED STATES PATENT OFFICE 2,606,627

AUTOMATIC GAS DRIER

Gunnar C. F. Asker, Washington, D. C., assignor, by mesne assignments, to Daly, Merritt and Sullivan, Incorporated, Washington, D. C., a corporation of Delaware Application March 22, 1948, Serial No. 16,325

6 Claims. (Cl. 183—4.1)

1

The present invention relates to apparatus for reducing the moisture content in air and other moisture laden gases and primarily to such apparatus designed for ultimate simplicity and completely automatic operation.

Air driers of the character herein have been known for automatic operation but such construction involved use of expensive automatic controls such as, solenoid operated valves or motor operated valves together with separate motor operated timer and switching mechanism for operation of a drier and regeneration of the drying bed thereof. The air drier of the present invention has its automatic valve, cycle timing and switching mechanisms combined for simplified operation by a single motor either for a single or duplex unit and for control of dry and wet air outlets or inlets or both whereby an economical and compact simplicity is effected.

In its broadest aspect the dehumidifier described herein is similarly useful for drying air in storage areas, basements, vaults, closets, display windows, etc., as are other known automatic construction, but it is ultimately simplified whereby single motor operation, suitable valve control, timing thereof, regeneration of a bed by heating is effected for a single or double unit, for control of either wet and dry air outlets or for both wet and dry air inlets and outlets, and the unit so constructed is of more compact and economical construction and is better suited for these applications.

It is accordingly a primary object to design a combined valve, timer and switching mechanism operated by a single motor to effect completely automatic operation for a gas drying bed and periodic regeneration thereof.

It is a further object to provide such single motor operated valve, timing and switching mechanism for control of both air inlet from a plurality of sources and air outlet to a plurality of places, whereby only recirculated partially dried air from the space requiring dry air need be passed through the bed, thus prolonging the useful air drying cycle of the bed, and air from an outside source may be used for removing expelled moisture during regeneration whereby the moisture infiltration to the dry air space during the regeneration cycle is less than if air for regeneration is drawn from the space to be dehumidified according to conventional practice; and useful dry air from the drier may be passed into the space requiring dry air or wet air produced during regeneration of the unit may be passed outside of the system.

It is a further object to provide such single mo-

2 tor automatic control for either a single or duplex unit whereby one bed automatically will produce dry air while the other is being regenerated. It will be understood that the term "duplex" as used herein refers to two independent units each having one or more drying beds combined only in automatic timing features for cooperative production of dry air.

Further objects and advantages of the present invention will be apparent from the following description, reference being made to the accompanying drawing wherein a preferred form of the present invention is illustrated.

Fig. 1 shows an elevation in section taken along the lines 1—1 of Fig. 2;

Fig. 2 is a section taken along the line 2—2 of Fig. 1, showing additional optional construction whereby a single bed air drier unit may be operated according to the principles of the present invention as a duplex bed unit;

Fig. 3 shows a wiring diagram for the electrical hookup useful herein;

Fig. 4 is a modified form of the drier, showing an elevation in section with automatic controls for valves of both inlet and outlet air; and Fig. 5 is an elevation in section taken on the line 5—5 of Fig. 4.

Fig. 6 is a detail showing a wet air duct mounting, valve and microswitch.

Fig. 7 is a section in elevation taken on the line 7—7 of Fig. 4.

The drier shown in Figs. 1 and 2 is encased in a box-like cabinet 10, having a removable cover 11. Centrally mounted within the casing 10 and removably supported on angle irons 12 is a box-like container 13 having an open bottom and top which may be covered on the top but at least on the bottom as shown by a supporting screen 14 and filled with granular air drying materials 15 of a conventional nature, such as, silica gel, adsorbent or absorbent clays, sova beads, activated alumina, calcium chloride or other air-drying materials. Centrally fixed within the bed of air-drying material 15 are a plurality of heating elements 16 such as, coiled heating wire of the character of Nichrome, preferably encased in a protective body 17 of an electrical insulating and heat stable nature, designed to protect the heating coils from abrasion and corrosion by the drying material and to distribute the heat more evenly to the drying material and thus prevent overheating or burning thereof by direct contact with the heating wire.

As shown in Figs. 1 and 2, air may enter through an opening in the casing 18 through a perforated plate 19 passing through a rough filter 20 for dust removal of a character of matted fiber, preferably inorganic, such as glass or other mineral or metal wool. The air passes into the suction of a blower 21 operated by a motor 22 passing out through 23 into the upper portion of the drier above the drier bed 15, the upper chamber serving as a plenum to eliminate air currents, equalizing the pressure, and thus prevent channeling of the drier bed. The air passes downwardly through the bed 15 into the lower chamber 24 and thence out through air duct 25 as dried air leading to the space wherein dried air is desired, such as of the character mentioned above.

When the bed is to be regenerated the duct 25 will be closed by suitable valve operation and a wet air duct 26 will be simultaneously opened leading to a point of disposal outside the system for wet air. During regeneration the bed will be simultaneously heated by the heating element 16 to a temperature adequate for regeneration thereof and the air passing through the bed under these conditions will remove the moisture therefrom and pass out through duct 26. The operation, therefore, for drying and regeneration is carried on automatically by the apparatus, as hereinafter described, which times the ultimate cycles of heating the bed and directing the flow of air by proper valve operation either through duct 25 as dry conditioned air or duct 26 as wet air removed from the bed as it is regenerated.

For automatic control, a suitable motor 27 is mounted through bracket 28 on the wall 10 of the casing and turns a cam disc 29 mounted on a shaft 30a thereof at any desired rate through suitable built-in reduction gearing. The disc will preferably be rotated at a rate of one rotation in from one to four hours but this rate may be adjusted higher or lower as desired depending upon the needs of the cycle, which for most efficient operation will vary with the amount of desiccant used in the drying bed, that is, with the designed capacity of the unit. The edge or periphery of the cam disc 29 has a portion 30 cut to a smaller diameter during a portion of a segment thereof than a remaining segment 31.

The length of each segment 30 and 31 corresponds to a certain number of degrees of rotation of the cam disc 29, and each segmental portion controls alternately the drying and regenerating cycle of the bed, the ratio of the segmental portions will be accurately fixed with respect to the cycle periods desired.

Mounted beneath the drying bed 15 are suitable supporting brackets 32 bored at 33 to receive a shaft 34 for rotation therein. Suitable collars 35 are mounted on the shaft 34 to adjust the axial position thereof between the brackets 32. Protruding through one of the brackets 32 and integral with the shaft 34, is a crank arm 36 which cooperates with and rests upon the periphery of the cam disc 29 so as to contact and slide on the surface 30 in its lowest position and by rotation to a higher crank angle to contact and ride upon the larger diameter surface of the periphery 31 portion thereof. Fixed intermediate the collars 35 and pinned to the shaft 34 is a valve arm 37 for oscillation therewith according to the angle set by the crank 36.

Mounted on lower end of valve arm 37 and extending therefrom through suitable adjustable studs 38 are valve discs 39 and 40 carrying valve seats 41 and 42, of any suitable shape shown herein as discs fixed to arm 37 at a suitable angle to cover air ducts 25 and 26 in alternate positions as carried through an arc through which the valve arm 37 passes when oscillated by shaft 34 and crank 36.

A torsion spring 43 is co-axially mounted about shaft 34 having one end fixed in the bracket 32 and the other end rigidly fixed to valve arm 37 so as to continuously urge valve arm 37 and valve 40 carried thereby into valve seating position on the dry air duct 25. Thus during rotation of the cam disc 29, when the crank arm 36 rides on the periphery portion 30 thereof and is in full extended position, the normal bias of a torsion spring 43 will hold the valve 42 seated on dry air duct 25 thereby opening the wet air duct during that portion of the cycle, which is the outlet valve position for regeneration.

As the cam disc 29 rotates such that the raised larger diameter periphery portion 31 comes in contact with the crank arm 36, the shaft 34 through the crank 36 will be rotated against the torsion of spring 43 and the valve arm 37 will be oscillated in an arc to the opposite position so that the valve 39 now seats on wet air duct 26, which is the outlet valve position of normal dry air production. Thus by continuous rotation of the cam disc 29 and cooperation therewith of torsion spring 43, valve arm 37 is alternately oscillated to close either of ducts 25 or 26.

Mounted on the outer end of shaft 34 for oscillation by crank 36 therewith, is a switch arm 44, and cooperating therewith, and supported by a bracket 45, is an electrical switch 46, preferably a sensitive microswitch as shown in Fig. 6 of known construction which needs very little torque, .05 lb. per inch, for operation by making and breaking an electrical circuit by alternate oscillations of said arm 44. Switch arm 44 is pinned to shaft 34 for rotation therewith in such position that the circuit through micro-switch 46 will be completed when the shaft 34 is rotated by cam disc 29 to simultaneously close the dry air duct 25 and open the wet air duct 26, the switch 46 closes the circuit to the heater elements 16 for heating the bed for regeneration thereof.

A wiring diagram is shown in Fig. 3 wherein a fan motor 22 and the timer motor 27 are connected in circuit to the input voltage applied conventionally across terminals 47. A heating element 16 becomes part of this circuit when the switch 46 is closed. A conventional thermostatic switch 46' (Fig. 6) may be included in the circuit or substituted for switch 46 to guard against any overheating of the bed if the fan motor should fail.

In operation, air drawn into the unit through an opening 18 in the cabinet is filtered to remove dust through filter 20 and is picked up by the blower 21 and forced into the upper part of the cabinet 10 through blower outlet 23. The timer 27 and fan motor 22 are in continuous operation. Air from the upper part of chamber 10 passes down through the drier bed 15 either for being dried and having moisture extracted thereby or for removing moisture and regeneration of the bed when the same is heated. Continuous rotation of the cam disc 29 will alternately raise and lower crank arm 36 in contact with either periphery portion 31 or 30 and the valve seats 41 and 42 will close either of ducts 25 and 26 depending upon the position of the crank arm. Simultaneously, when the wet air duct 26 opens, switch arm 44 is also moved by crank arm 36 to close the circuit of the micro-switch 46 activating the heater elements 16 in the bed 15 for regeneration thereof.

Instead of a single bed unit the invention may be constructed as a double bed unit with independent walls, or, as shown in Fig. 2, by extension of the cabinet with a partitioning wall 10'. The double bed unit may be exactly duplicate single bed units with the exception that the timer motor 27 mounted in either cabinet could operate two cam discs 29 and 29' of the duplex unit through an extending shaft 48. Thus the duplex unit would be exactly the same construction of the operating parts except that the crank arm would be an image, that is, constructed to the left hand of that already described, with the coacting switch, torsion spring and valve arm likewise constructed to the left hand. For operation with such duplex unit, the cam disc would be generally set so that one unit would be regenerating the bed while the other would be producing dry air at least for a portion of their cycles. Thus cam discs 29 and 29' would have their periphery portions 30 set to contact their crank arms 36 in sequence rather than simultaneously.

In Fig. 4 is shown a modification wherein the air intake is alternately varied by a valve so as to intake and recirculate previously dried air while the drying unit is operating for drying the air, and an alternate intake for intaking ordinary air from outside the dry air system for purposes of regenerating the bed. It will thus be apparent with such modification that the efficiency of the drying unit may be considerably increased by normally intaking previously and thus partially dried air from the system to be dried as recirculated air, and using extraneous undried air for regenerating the bed without thus losing more valuable previously dried air and thereby avoiding adding to the moisture load in the space to be dried by infiltration of outside air to this space, which is the case when air for regeneration is drawn from the dry air space.

To this end, the unit comprises in modified form a cabinet 50 having a cover 51 and separated from one of the side walls a partitioning element 52 running continuously from side to side and from top to bottom to separate from the main drying unit interior 53 an air intake section 54. Recirculated dry air may enter the inlet section 54 through a duct 67 and extraneous air from outside the system may enter the intake section 54 through a duct 69. The ducts 67 and 69 have their openings brought into the intake section at cooperating points whereby ultimately to be opened and closed by an inlet valve 57' having seats on opposite faces 58 and 59 for alternate closing of the ducts 67 and 69. The valves 57 or 57' may be of similar construction to that of valves 39 and 40 but as shown in Figs. 4 and 5 are somewhat modified and comprise the valve body 57 (or 57') self-adjustably mounted through a central shaft 60 rotatably carried in both arms of a yoke 61 integrally joined to a valve arm 62.

The valve arm 62 is pinned to a shaft 34 somewhat extended but similar to the shaft 34 hereinabove described for Figs. 1 and 2, extending into the outer intake section 54 and supported for rotation through the partition 52 by a trunnion 63. Similar to such construction described above, the shaft 34 may also carry a valve arm 37 biased by a torsion spring 43, a crank arm 36 riding on a cam disc 29 slowly rotated by timing motor 27, the only difference being that the crank arm 36 extends upwardly for operation between dry and wet air outlet ducts 25 and 26 mounted in this modified form in the upper portion of the drying unit at about the same level as the air inlet ducts 67 and 69. As will be evident from this construction the operation of valves 39 and 40 through the cam disc 29 moving the crank 36 and rotating the shaft 34 and valve arm 37 connected thereto, will be the same as described above for both wet and dry air outlets of Figs. 1 and 2.

According to this modification of Figs. 4 and 5 the arm 34 will also oscillate valve arm 62 for timed and synchronated control of reactivation (ordinary) and recycled dry inlet air. By the automatic control of this modification when the dry air outlet 55 is open, the recycled dry air inlet 67 will simultaneously be open. When the wet air outlet 56 is open for removal of wet air when the unit is being regenerated, the extraneous or wet air inlet 69 will simultaneously be open. Thus both air inlet and air outlet valves will be simultaneously and automatically operated for both inlet and outlet control. A switch arm 44' for activating the heater elements 16 is shown in this modification as mounted on the valve arm 62 through the switch 46 to supply heat for regenerating the drying bed. As indicated in the dotted line position of Fig. 4, the timing motor 27 may optionally be enclosed in a protective shell insulating the same from possible destructive effects of the gas.

Similar to the construction shown in Fig. 2 the motor shaft of timer motor 27 of Figs. 4 and 5 may be extended to operate both outlet and inlet valves of a duplex unit. As further shown in this modification the fan 21 is mounted at the bottom of the unit and will take air from the inlet section 54 to a filter unit 20 and pass the same upwardly through the drying bed 15 having electrical heating coils 16 mounted therein in somewhat modified form, as shown, for regeneration of the bed.

As shown in Fig. 6, to ensure tight seating of the valve on the wet inlet and outlet ducts 69 and 56 these ducts are preferably mounted in the chamber wall by spring 64 through a flexible joint collar 65. Such construction allows for wear on the cam and valve material to give a continuously tight and resilient seal against the valve seat 64. The micro-switch conventionally is merely a sensitive spring body completing contact by pressure of arm 44.

As shown in Fig. 7 the inlet ducts are similarly aligned and if desired the juncture with the wall may be a direct pipe juncture passing in a straight line through the wall or, for convenience in connecting the pipe inlet thereto, one of the inlets may have an elbow bend from a 90° angle, whichever inlet direction is most convenient. Thus the inlet duct 67 may pass through the wall and bend through an elbow for alignment with the opposite inlet duct or an inlet duct 66 may be additionally provided where it is desired to extend the same through another wall, this being usually closed off by a cap 68.

In operation of this form of the invention for air drying, shown in Figs. 4 and 5, when peripheral portion 31 of cam disc 29 turns crank 36 and valve arms 37 and 62 therewith, the valve seat 59 will close extraneous air inlet 69 and dry air inlet 67 will be open; dry air outlet 55 will be open and wet air outlet 56 will simultaneously be closed. Recirculated dry air from the system will enter through duct 67 into the inlet portion 54 and through filter 20 as drawn by the suction of blower 21 as operated by motor 22. The air will pass upwardly through the dry air chamber 53 and into the bed of air drying material 16 for further drying thereof, and the dried air will pass out of dry air duct 55. When the cam disc 29, continuously rotating, releases crank 36 to the periphery portion 30 thereof to allow rotation of shaft 34 and oscillation of both valve arms 37 and 62 pinned thereto by the torsion of spring 43 to the opposite valve closure position and thereby close dry inlet and outlet ducts 67 and 55, respectively, and simultaneously open normal regeneration air inlet and outlet ducts 69 and 56, respectively, the unit will be in the regenerative portion of the cycle. Extraneous air, which has not been dried, will then be drawn and filtered into the inlet section 54 through the open regeneration air duct 69 and passes for removal of moisture through the heated bed 16 and thence out through open wet air outlet 56. It will be understood that in the regenerative position the heating units will be activated by the micro-switch 46 simultaneously making contact with the positioning of the valves for this cycle by rotation of shaft 34 and valve arm 62 carrying switch arm 44' for contact therewith.

As described above where a duplex unit is operated, using control of both inlet and outlet valves, the timing of the duplicate units will be adjusted to have reached substantially the opposite or air drying portion of the cycle while the complementary unit is being regenerated.

The foregoing description thus shows a substantially simplified unit having only a single motor for easy and automatic production of dry gases and regeneration thereof and, as will be noted, the valves and timing, heating for regeneration, for control of both inlet and outlet and for operation as a duplex unit, is taught.

While the unit herein has been described throughout as an air drier, it will be apparent that it is equally useful for drying moisture laden gas of any character.

Various modifications will occur to those skilled in the art and it is intended that the foregoing description be regarded as illustrative and not limiting except as defined in the claims.

I claim:

1. Automatic gas drier having a chamber and a bed of drying material disposed therein, electrical heating elements in said bed, means for passing gas through said bed of drying material, at least one gas inlet and a plurality of gas outlets in aligned position mounted in said chamber to receive and lead the same to independent disposal areas, the gas inlet and outlets communicating with opposite sides of said bed, a single valve element comprising a closure mounted to alternately seat by oscillation on each of said outlets closing one thereof while opening the other, a rotary to oscillating mechanical linkage comprising a shaft mounted for oscillation carrying said valve for oscillation thereof between the said outlets, an electrical switch element in circuit with said heating elements, an arm mounted on said oscillating shaft and cooperating with said switch to make and break the electrical circuit through said switch with each oscillation of the shaft, a crank mounted on said shaft for oscillating actuation thereof, a single continuously rotating timing motor carrying a cam disc continuously rotated thereby, said cam disc coacting with said crank whereby to oscillate the same by cam action as the timing motor is continuously rotated, said timing motor rotating said cam disc and oscillating said shaft at a rate corresponding to a desired gas drying and regenerating cycle.

2. Automatic gas drier having a chamber and a bed of drying material disposed therein, electrical heating elements in said bed, means for passing gas through said bed of drying material, at least one gas outlet and a plurality of gas inlets in aligned position mounted in said chamber to receive gas from independent sources, the gas inlets and outlets communicating with opposite sides of the bed, a duplex valve element comprising a closure mounted to alternately seat by oscillation on each of said inlets, closing one thereof while opening the other, a rotary to oscillating mechanical linkage comprising a shaft mounted for oscillation carrying said valve for oscillation thereof between the said inlets, an electrical switch element in circuit with said heating elements, an arm mounted on said oscillating shaft and cooperating with said switch to make or break the electrical circuit through said switch with each oscillation of the shaft, a crank mounted on said shaft for oscillating actuation thereof, a single continuously rotating timing motor carrying a cam disc continuously rotated thereby, said cam disc coacting with said crank whereby to oscillate the same by cam action as the timing motor is continuously rotated, said timing motor rotating said cam disc and oscillating said shaft at a rate corresponding to a desired gas drying and regenerating cycle.

3. Automatic gas drier having a chamber and a bed of drying material disposed therein, electrical heating elements in said bed, means for passing gas through said bed of drying material, a pair of aligned gas inlets and a pair of aligned gas outlets mounted in said chamber to receive and lead the same to independent disposal areas, the gas inlets communicating with one side and outlets communicating with the opposite side of said bed, a single valve element comprising a closure mounted to alternately seat by oscillation on each of the pair of said inlets and a single valve element comprising a closure mounted to alternately seat by oscillation on each of the pair of said outlets, a rotary to oscillating mechanical linkage comprising a shaft mounted for oscillation carrying both valve elements for oscillation thereof between the pairs of inlets and outlets, an electrical switch element in circuit with said heating elements, an arm mounted on said oscillating shaft and cooperating with said switch to make and break the electrical circuit through said switch with each oscillation of the shaft, a crank mounted on said shaft for oscillating actuation thereof, a single continuously rotating timing motor carrying a cam disc continuously rotated thereby, said cam disc coacting with said crank whereby to oscillate the same by cam action as the timing motor is continuously rotated, said timing motor rotating said cam disc and oscillating said shaft at a rate corresponding to a desired gas drying and regenerating cycle.

4. Automatic gas drier comprising a chamber, a vertical partitioning element mounted vertically therein and extending from side to side to define a main drying chamber and an inlet chamber, a bed of drying material disposed in the main chamber, electrical heating elements disposed in said bed, means for drawing gas from the inlet chamber and passing the same through the bed in the main chamber, a plurality of aligned gas outlets above said bed in the main chamber and a plurality of aligned gas inlets in the inlet chamber, a single valve element mounted to oscillate between aligned outlets alternately closing one while opening the other by oscillation therebetween, a single valve element mounted to oscillate between aligned inlets, alternately closing one while opening the other by oscillation therebetween, a single oscillating shaft extending through both inlet and outlet chambers supporting both valve closures therein for simultaneous oscillation of both between aligned inlets and outlets, an electrical switch mounted in said chamber adapted to make and break the electrical circuit through said heating elements, a switch arm mounted to oscillate with each oscillation of said oscillating shaft, said switch arm cooperating with said electrical switch for making and breaking the electrical circuit therethrough with each oscillation of said oscillating shaft, a crank arm mounted on said oscillating shaft for oscillating actuation thereof, a timing motor adapted to rotate at a rate controlled by a desired gas drying and regenerating cycle and a cam carried by said timing motor, said cam mounted to coact with the crank arm of said oscillating shaft for oscillation thereof by rotary cam movement thereagainst.

5. Duplex automatic gas drier comprising a pair of chambers each having the structure defined in claim 4, a single timing motor in one of said chambers, a pair of cams mounted for rotation in each chamber coacting with each crank arm for oscillation thereof by rotation of the cam surface in contact therewith, said timing motor connected for rotary drive of both cams in each chamber, said cam surfaces being angularly disposed with respect to each other whereby the air drying and regenerating cycle of one of said chambers controlled by rotation of said cam is substantially at the opposite phase of the cycle controlled by the other cam.

6. Automatic gas drier having a chamber and a bed of drying material disposed therein, electrical circuit means including electrical heating elements in said bed, an electrical switch for connecting said heating elements to an electrical source, means for passing gas through said bed, at least one gas inlet and two gas outlets mounted in said chamber communicating respectively with opposite sides of said bed, said gas outlets being aligned and having a single valve closure means for both of said gas outlets mounted to oscillate therebetween, a rotary to oscillating power transferring unit comprising a driven element mounted for oscillating movement within said chamber, said driven element having said valve closure means attached thereto for oscillating movement therewith to alternately close said aligned gas outlets, an arm mounted on said driven element cooperating with said switch to make and break the electrical circuit means with each oscillation, a single continuously rotating timing motor carrying a cam cooperating with said driven element, said cam being shaped to displace said driven element and thereby effect oscillation thereof as the cam is rotated by said motor, said cam being driven by said motor at a rate corresponding to a desired gas drying and bed regenerating cycle, one of said gas outlets being closed and the switch open during the gas drying phase, and the other outlet being open with the switch closed during the bed regenerating phase.

GUNNAR C. F. ASKER.

REFERENCES CITED

The following references are of record in the file of this patent:

UNITED STATES PATENTS

| Number | Name | Date |
|---|---|---|
| 1,924,849 | Fonda | Aug. 29, 1933 |
| 2,052,931 | Lednum e tal. | Sept. 1, 1936 |
| 2,075,036 | Hollis | Mar. 30, 1937 |
| 2,101,555 | Moore et al. | Dec. 7, 1937 |
| 2,201,688 | Zuhlke | May 21, 1940 |
| 2,248,225 | Fonda | July 8, 1941 |
| 2,471,376 | Peters | May 24, 1949 |
| 2,501,280 | Kemp et al. | Mar. 21, 1950 |